United States Patent
Hübler et al.

[11] Patent Number: 5,878,632
[45] Date of Patent: Mar. 9, 1999

[54] AUTOMATIC TRANSMISSION, IN PARTICULAR FOR MOTOR VEHICLES

[75] Inventors: Wolfgang Hübler, Deggenhausertal; Gerhard Martin, Langenargen; Peter Tiesler, Meckenbeuren, all of Germany

[73] Assignee: ZF Friedrichshafen AG, Friedrichshafen, Germany

[21] Appl. No.: 817,211

[22] PCT Filed: Oct. 11, 1995

[86] PCT No.: PCT/EP95/04001

§ 371 Date: Apr. 11, 1997

§ 102(e) Date: Apr. 11, 1997

[87] PCT Pub. No.: WO96/12125

PCT Pub. Date: Apr. 25, 1996

[30] Foreign Application Priority Data

Oct. 13, 1994 [DE] Germany ............... 44 36 505.5

[51] Int. Cl.[6] .............. F16H 57/02; F01M 9/00
[52] U.S. Cl. ..................... 74/606 R; 184/6.12
[58] Field of Search ............... 74/606 R, 467; 184/6.12, 31, 101

[56] References Cited

U.S. PATENT DOCUMENTS

| | | | |
|---|---|---|---|
| 3,666,320 | 5/1972 | Lanfermann | 184/6.12 |
| 4,368,802 | 1/1983 | Grabill et al. | 184/6.12 |
| 4,501,167 | 2/1985 | Saito | 74/467 |
| 4,752,279 | 6/1988 | Ogino | 474/91 |
| 4,754,847 | 7/1988 | Glaze et al. | 184/6.12 |
| 4,889,621 | 12/1989 | Yamada et al. | 74/467 |
| 4,903,798 | 2/1990 | Takemoto et al. | 184/6.24 |
| 5,050,447 | 9/1991 | Hyakawa et al. | 74/606 R |
| 5,189,929 | 3/1993 | Chory | 74/606 A |
| 5,211,262 | 5/1993 | Akiyama . | |
| 5,222,576 | 6/1993 | Meuer et al. | 184/7.4 |

FOREIGN PATENT DOCUMENTS 4200910  7/1993  Germany .

*Primary Examiner*—Vinh T. Luong
*Attorney, Agent, or Firm*—Larson & Taylor

[57] ABSTRACT

The automatic transmission, which is intended for motor vehicles in particular, has an internal gear pump for supplying a hydrodynamic converter, a lubricating device and control and actuation devices of the automatic transmission, via a main pressure valve. An excess flow returns from the main pressure valve back to the internal gear pump via a feed channel (18). The feed channel (18) has a cross section which is steadily reduced in the direction toward the internal gear pump and has a feed nozzle (20) on its end facing the internal gear wheel pump. The feed channel (18) with its feed nozzle (20) terminates near the suction zone of the internal gear pump in a suction channel (14) connected with a reservoir. To simplify manufacture and to improve the function, the latter, in particular with a view to an advantageous charging of the internal gear pump, the feed channel (18) and the feed channel (20), are cast in the pump housing (1) by the lost-wax method.

13 Claims, 2 Drawing Sheets

AUTOMATIC TRANSMISSION, IN PARTICULAR FOR MOTOR VEHICLES

The invention relates to an automatic transmission, in particular for motor vehicles, with a positive displacement pump for supplying a hydrodynamic converter, a lubrication device and control and actuation devices of the automatic transmission via a number of control channels, wherein the positive displacement pump is driven at the rpm of the drive engine and wherein an excess flow of a pressure medium under pressure is fed to the positive displacement pump for charging it.

In such known automatic transmissions the pumps are so-called constant pumps, i.e. that a constant feed volume is supplied with every revolution of the drive engine and thus of the positive displacement pump. The feed flow of such a pump increases proportionally with its drive rpm. The design of the pump is generally based on its idle rpm. The feed flow supplied in this case already must meet the requirements of the transmission to be supplied.

At higher rpm, such a pump conveys a multiple of the required amount. A correspondingly large amount of pressure medium must be aspirated. Cavitation and pressure fluctuations therefore occur at higher rpm. Cavitation results in noise and pressure fluctuations cause steering problems.

An automatic transmission is known from DE-A1-42 00 910, wherein the pump is charged by an excess flow. The excess flow comes from a flow control valve or a pressure control valve. Here the excess flow emerges from a pressure bore of the flow or pressure control valve into a transverse bore, whereby it pressure control valve into a transverse bore, in the process pulls pressure medium out of a suction bore, which is connected with a reservoir, and flows from there into the suction nodule of the positive displacement pump.

Thus, a relatively large outlay is necessary for charging the positive displacement pump: a flow or pressure control valve must be installed in an additional bore cutout of the pump housing. The transverse bore must be cut very exactly, so that it is in a correct relationship with the control edges of the flow or pressure control valve. Furthermore, a certain amount of installation space for the flow or pressure control valve is required in the automatic transmission.

An automatic transmission is known from U.S. Pat. No. 3,620,646, in which an excess flow of a flow control valve is used for charging a positive displacement pump. In this case the excess flow is a function of the amount. The pressure in the automatic transmission is not taken into consideration.

Another arrangement of a stream feed of an internal gear pump is shown in FR-A-2443598. In this case a feed stream of an internal gear pump is introduced coaxially with a suction flow. This arrangement is very difficult to produce.

Furthermore, in this arrangement a very large distance in relation to the length of the injector is provided in between the feed nozzle and the suction nodule. This distance is preset because of a diffusor, which must be connected to the nozzle, and a mixing tube following this.

A similarly large distance in relation to the length of the feed nozzle is also provided in U.S. Pat. No. 3,620,646.

The invention is based on the object of creating an automatic transmission wherein charging of the positive displacement pump can be realized in a cost-effective manner by simple means and in the process requires as little space as possible.

SUMMARY OF THE INVENTION

This object is attained by the automatic transmission of the present invention. The object is attained in that in an automatic transmission in accordance with the present invention the feed nozzle terminates in the vicinity of the suction area of the positive displacement pump in a suction channel connected with a reservoir.

Advantageous and useful embodiments of the invention are recited in the description. The feed channel and the feed nozzle can be cast in the pump housing in a particularly simple manner by the lost-wax process. By means of this it is also possible to steadily reduce its cross section in a simple manner, so that the pressure medium can be fed to the positive displacement pump without reversing or causing shock losses.

If the positive displacement pump is embodied as an internal gear wheel pump, a propelling flow being generated from the excess flow of the main pressure valve and flowing through the feed nozzle is advantageously directed tangentially in respect to the center line of a suction nodule of the internal gear pump. In order to be able to fully employ the momentum of the propelling flow, the propelling flow is directed in the direction of movement of the internal pump gear of the internal gear pump.

An angle between 10° and 60° has been shown to be advantageous as the angle between the propelling flow flowing through the feed nozzle and the suction flow flowing through the suction channel.

The particular closeness of the feed nozzle to the suction zone is characterized in that the distance of the nozzle from a suction nodule arranged in the suction zone to the length of the feed channel in which its cross section is reduced, lies at a ratio of 1:2 to 1:5. In the arrangements of the prior art described above the respective ratio is more than the reverse.

The invention will be explained in detail below by means of an exemplary embodiment represented in the drawings. Shown in:

DETAILED DESCRIPTION OF THE PREFERRED EMBODIMENT

Figure 1:
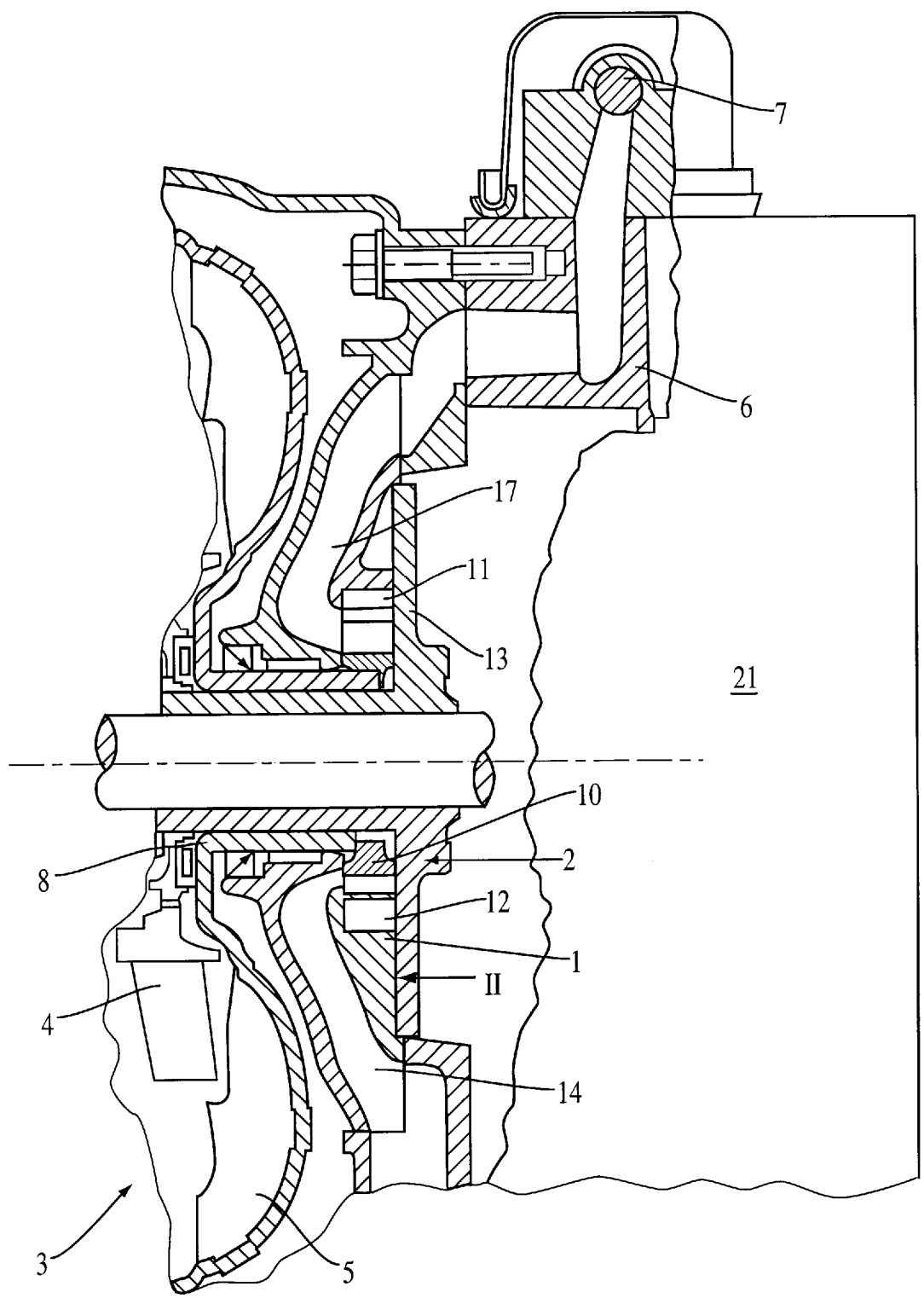
FIG. 1, a partial longitudinal section through the automatic transmission in the area of the positive displacement pump.
Figure 2:
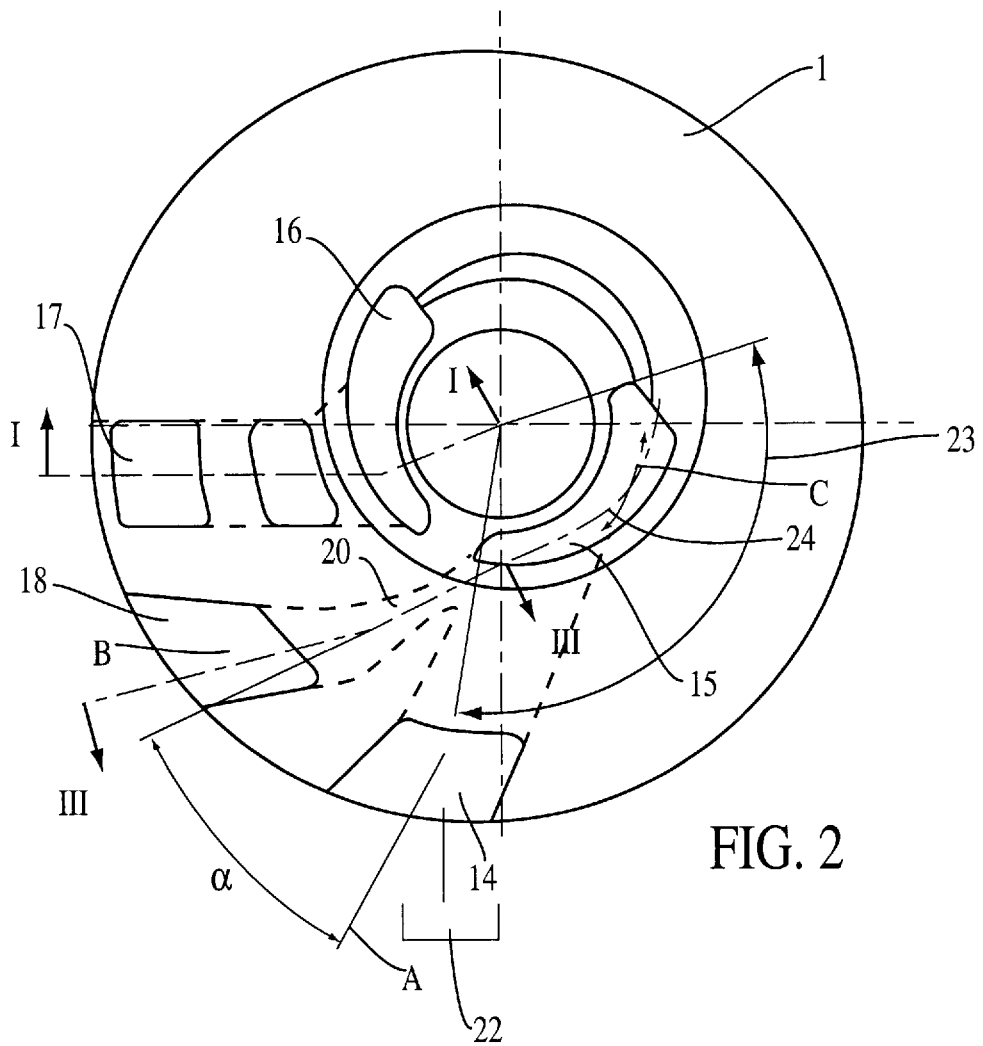
FIG. 2, a top view of the pump housing in accordance with the arrow II in FIG. 1.

The longitudinal section in FIG. 1 follows two sectional planes: the upper half of the section essentially follows the line I—I in FIG. 2, the lower half of the section essentially follows the arrow A and leads to the center of the automatic transmission.

A positive displacement pump in the form of an internal gear pump 2 is arranged in a pump housing 1 in the interior of the automatic transmission 21. A hydrodynamic converter 3, of which only one stator 4 and a pump gear 5 is shown, is arranged adjacent to the internal gear wheel pump 2. The actual transmission 21, which includes a the transmission housing 6 and a main pressure valve 7, is located on the other side of the internal gear pump 2.

An internal gear 10 with teeth on the exterior is fastened on a torque converter impeller hub 8, which is fixedly connected with the pump wheel 5. The internal gear 10 meshes with an internally toothed annular gear 11. The design of the internal gear 10 and the annular gear 11 is generally known, for example from DE 30 05 657 C2. Since the pump gear 5 turns at the rpm of a drive engine, not shown, the internal gear 10 is also driven at this engine rpm.

Work chambers 12 formed between the internal gear 10 and the annular gear 11 are bordered on the converter side in the axial direction by the pump housing 1 and on the transmission side by a separating plate 13.

Figure 3:
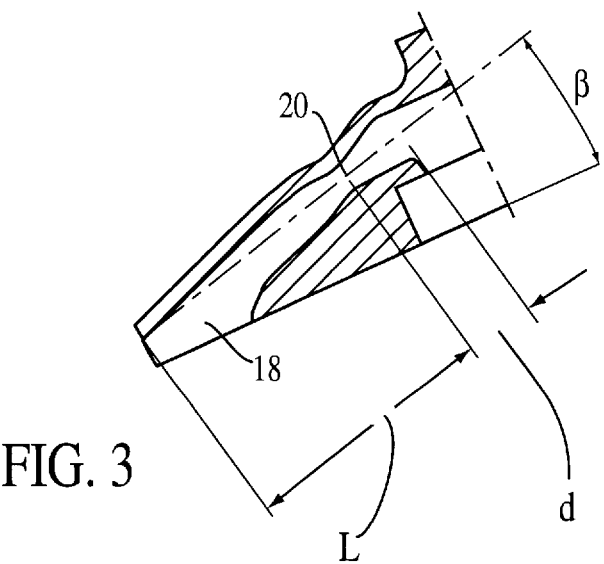
FIG. 3, a partial section essentially in accordance with the line III—III in FIG. 2.

The internal gear pump 2 aspirates pressure medium from a reservoir 22, through a suction channel 14 into a suction nodule 15. The pressure medium is conveyed from a pressure nodule 16 through a suction channel 17 to the main pressure valve 7. The design and function of the main pressure valve 7 is not essential for the invention and will therefore not be described in more detail. It is only important that unnecessary pressure medium under high pressure flows away from the main pressure valve 7 as an excess flow and is fed via a feed channel 18 disposed in the pump housing 1 to the aspirating side of the internal gear pump 2. The feed channel is represented in FIGS. 2 and 3. Its further course up to the main pressure valve 7 corresponds to the course of the pressure channel 17 in FIG. 1.

The cross section of the feed channel 18 is steadily reduced in the direction toward the internal gear pump 2 until the feed channel 18 forms a feed nozzle 20 at its end facing the internal gear pump 2. With its feed nozzle 20, the feed channel 18 terminates near the aspiration zone, i.e. in a suction zone 23 at the suction nodule 15, with the suction channel 14. The feed channel 18 and the feed nozzle 20 are integrated in the pump housing 1 and can be embodied particularly cost-effectively and with a constant decrease in cross section in the pump housing 1 by lost-wax casting. In principle, the feed channel 18 and the feed nozzle 20 can also be produced by cutting or by the installation of an insert element containing the two pieces.

A propelling flow flowing through the feed channel 18 and the feed nozzle 20 in the direction of the arrow B is advantageously directed tangentially in respect to the center line 24 of the suction nodule 15 of the internal gear pump 2. The internal gear 10 and the annular gear 11 move in the direction of the arrow C. If the propelling flow is also directed in the direction of this arrow C by the feed nozzle 20, a particularly good feed of the internal gear pump 2 results, whereby a sufficient amount of pressure medium from the suction channel 14 is carried along with it.

Particularly good mixing of the propelling flow from the feed nozzle 20 and the suction flow from the suction channel 14, and therefore a particularly good feed, results if an angle α between 10° and 60° is enclosed between the two flows.

In FIG. 3, the feed channel 18 and the feed nozzle 20 lie at a defined angle β in respect to the front faces of the internal gear 10 and the annular gear 11. In the exemplary embodiment the angle β is approximately 10° to 15°. It is therefore necessary to reverse the feed flow prior to its entry into the suction nodule 15. The angle β of 10° to 15° is necessary in the exemplary embodiment because of the small amount of structural space available in the direction toward the converter 3. A lesser angle β, or the arrangement of the feed channel 18 and the feed nozzle 20 where the feed flow would not have to be reversed behind the feed nozzle 20, would be more advantageous for fluid flow, but would increase the required installation space.

In one embodiment, the distance d of the feed nozzle 20 from the suction nodule 15 arranged in the suction zone 23 as a ratio to the length L of the feed channel 18 is about 1:2 to about 1:5.

What is claimed is:

1. An automatic transmission for motor vehicles, with a positive displacement pump for supplying a hydrodynamic converter, wherein for feeding the positive displacement pump, an excess flow of a pressure medium under pressure from a main pressure valve of the automatic transmission is fed through a feed channel with a feed nozzle, and wherein the feed channel has a cross section which becomes steadily smaller in the direction toward the positive displacement pump and has the feed nozzle on its end facing the positive displacement pump, the improvement comprising the feed nozzle terminates in the vicinity of a suction zone of the positive displacement pump in a suction channel connected with a reservoir, so that a combination of a propelling flow flowing through the feed nozzle with a suction flow flowing through the suction channel takes place directly at a suction nodule disposed in the suction zone, and the feed nozzle is integrated in a pump housing.

2. The automatic transmission in accordance with claim 1, wherein the feed channel and the feed nozzle are cast in the pump housing by a lost-wax process.

3. The automatic transmission in accordance with claim 2, wherein the positive displacement pump is an internal gear pump.

4. The automatic transmission in accordance with claim 3, wherein the propelling flow flowing through the feed nozzle is directed tangentially in respect to the center line of the suction nodule of the internal gear pump.

5. The automatic transmission in accordance with claim 4, wherein an angle (α) of between 10° and 60° is enclosed between the propelling flow flowing through the feed nozzle and the suction flow flowing through the suction channel.

6. The automatic transmission in accordance with claim 5, wherein the distance of the feed nozzle from a suction nodule arranged in the suction zone as a ratio to the length of the feed channel, in which its cross section is reduced, is a ratio of about 1:2 to about 1:5.

7. The automatic transmission in accordance with claim 4, wherein the distance of the feed nozzle from a suction nodule arranged in the suction zone as a ratio to the length of the feed channel, in which its cross section is reduced, is a ratio of about 1:2 to about 1:5.

8. The automatic transmission in accordance with claim 3, wherein the propelling flow is directed in the direction of movement of an internal gear and an annular gear of the internal gear pump.

9. The automatic transmission in accordance with claim 8, wherein an angle (α) of between 10° and 60° is enclosed between the propelling flow flowing through the feed nozzle and the suction flow flowing through the suction channel.

10. The automatic transmission in accordance with claim 8, wherein the distance of the feed nozzle from a suction nodule arranged in the suction zone as a ratio to the length of the feed channel, in which its cross section is reduced, is a ratio of about 1:2 to about 1:5.

11. The automatic transmission in accordance with claim 1, wherein the distance of the feed nozzle from a suction nodule arranged in the suction zone as a ratio to the length of the feed channel, in which its cross section is reduced, is a ratio of about 1:2 to about 1:5.

12. The automatic transmission in accordance with claim 2, wherein the distance of the feed nozzle from the suction nodule arranged in the suction zone as a ratio to the length of the feed channel, in which its cross section is reduced, is a ratio of about 1:2 to about 1:5.

13. The automatic transmission in accordance with claim 3, wherein the distance of the feed nozzle from a suction nodule arranged in the suction zone as a ratio to the length of the feed channel, in which its cross section is reduced, is a ratio of about 1:2 to about 1:5.

* * * * *